United States Patent [19]

Palara et al.

[11] Patent Number: 5,142,218
[45] Date of Patent: Aug. 25, 1992

[54] POWER SUPPLY CIRCUIT FOR DIRECT VOLTAGE REGULATORS WITH STEP-UP SWITCHING CONFIGURATON

[75] Inventors: Sergio Palara, Acicastello; Stefano Sueri, Catania, both of Italy

[73] Assignee: SGS-Thomson Microelectronics S.r.l., Agrate Brianza, Italy

[21] Appl. No.: 602,207

[22] Filed: Oct. 23, 1990

[30] Foreign Application Priority Data

Oct. 25, 1989 [IT] Italy .................. 6614 A/89

[51] Int. Cl.⁵ ............................................. G05F 1/46
[52] U.S. Cl. ..................... 323/285; 323/901; 323/284
[58] Field of Search ............ 323/222, 285, 299, 901, 323/284, 234, 246, 259; 363/49; 303/101

[56] References Cited

U.S. PATENT DOCUMENTS

| | | | |
|---|---|---|---|
| 4,642,746 | 2/1987 | Lösel | 363/49 |
| 4,864,485 | 9/1989 | Rilly et al. | 363/49 |
| 4,866,590 | 9/1989 | Odaka et al. | 363/49 |
| 4,962,349 | 10/1990 | Albach et al. | 363/265 |

FOREIGN PATENT DOCUMENTS 0167194  6/1985  European Pat. Off. .
3523108  6/1985  Fed. Rep. of Germany .

Primary Examiner—Steven L. Stephan
Assistant Examiner—Ben Davidson
Attorney, Agent, or Firm—Herbert Dubno

[57] ABSTRACT

The circuit switches the power supply of the integrated circuit over to the input voltage of the switching regulator during the initial starting phase, and over to the output of said regulator once the steady state has been reached.

7 Claims, 2 Drawing Sheets

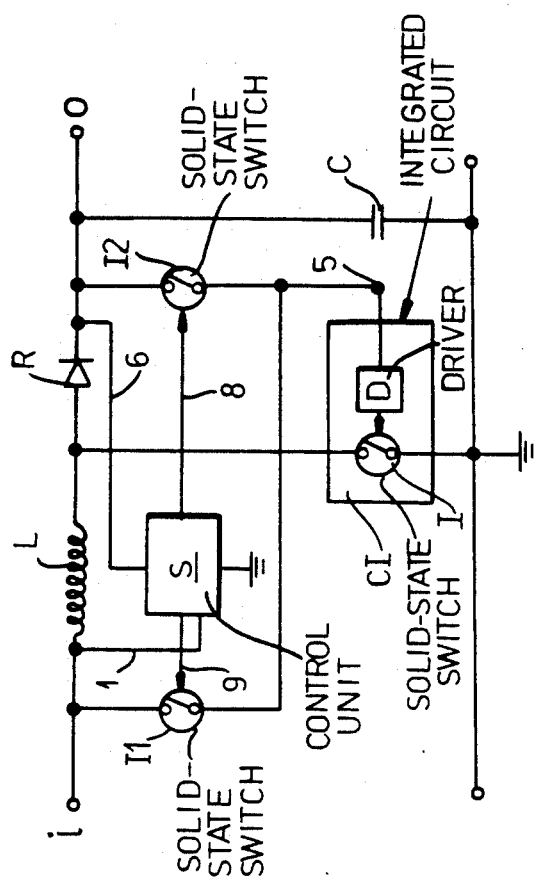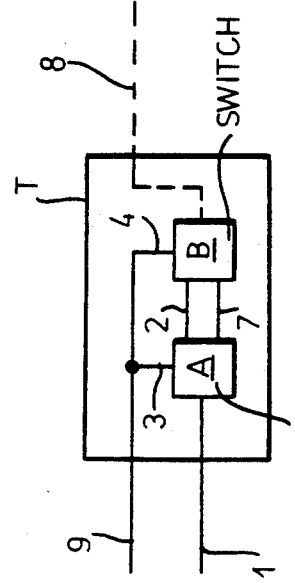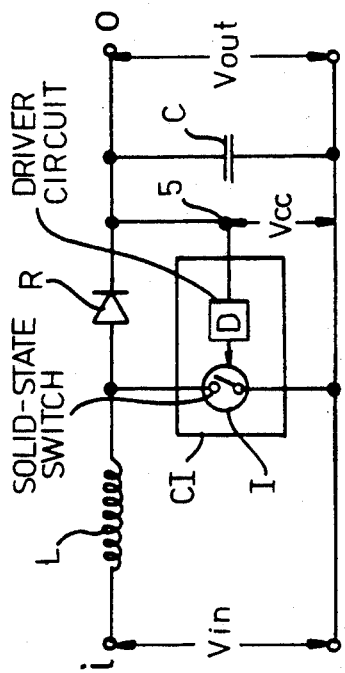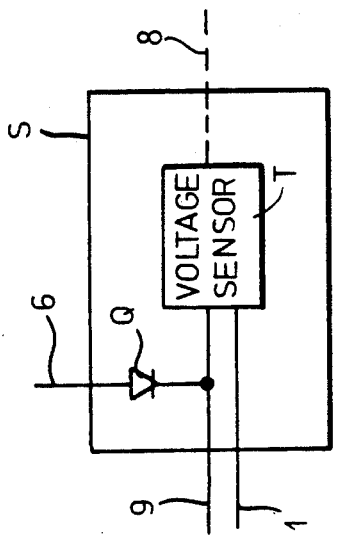
FIG.1 PRIOR ART
FIG.2
FIG.3
FIG.4

POWER SUPPLY CIRCUIT FOR DIRECT VOLTAGE REGULATORS WITH STEP-UP SWITCHING CONFIGURATON

This invention refers to a supply circuit for direct voltage regulators with a step-up switching configuration.

FIELD OF THE INVENTION

The voltage regulators of the aforementioned type are generally realized with an integrated circuit whose direct supply voltage Vcc is usually taken from the output of the regulator itself. In fact, since this voltage at the steady state has a higher value than the input voltage Vin, it enables the circuit to operate more efficiently.

This way of supplying the integrated circuit is satisfactory providing the output voltage remains higher, during each operating phase, than the minimum value Vccm (flashover threshold of the regulator) that the supply voltage of the integrated circuit must have in order to ensure its regular operation.

At the moment of the switching on of the regulator and until the output voltage stabilizes at its steady state value Vout>Vin, the output voltage itself has an initial value Vouti lower than the input voltage Vin by a quantity equal to the voltage drop $V_{FD}$ that occurs at the terminals of a forward biased diode (which for a silicon diode is equal to approximately 0.6 V). Therefore it can be assumed that the aforesaid efficient operation is ensured also during the initial starting phase if the condition Vin−$V_{FD}$=Vouti≧Vccm is fulfilled. Some integrated circuits however use technologies (such as for example the CMOS metal gate technology) which require flashover voltages Vccm which, although lower than the Vin, are higher than Vin−$V_{FD}$ difference, and which therefore do not ensure efficient operation during the starting phase.

OBJECT OF THE INVENTION

The object of the present invention is to provide a regulator supply circuit which can be triggered even by a Vccm voltage higher than the Vin−$V_{FD}$ difference, provided it is Vccm≦Vin.

SUMMARY OF THE INVENTION

The power supply circuit according to the invention comprises an integrated switching circuit supplying current pulses to an inductor, and using the voltage pulses originated at the terminals of the inductor to increase the charging voltage of a condenser. The invention provides, in combination:
  a first solid state switch and a second solid-state switch respectively connecting the supply terminals of the aforesaid integrated circuit to the input and output terminals of the regulator, the second switch being provided with a control electrode; and
  a control unit connected by one of its input terminals to the output terminals of the regulator, for controlling the first switch, which:
    actuates the closing of the first switch at the moment of the switching on of the regulator; and
    actuates the opening of the first switch and the closing of the second switch, when the voltage at the output terminals of the regulator has reached a given threshold value (Vout) which ensures the efficient operation of said integrated circuit.

According to the invention, the power supply circuit for a direct voltage regulator of the type with a step-up switching configuration, comprises an integrated switching circuit supplying an input pulse to an inductor and using the voltage pulses applied to the terminals of the inductor to increase the charging voltage of a condenser.

A first solid-state switch and a second solid-state switch respectively connect the supply terminals of the aforesaid integrated circuit to the input and output terminals of the regulator, the second switch being a diode. A control unit is connected by one of its input terminals to the output terminals of the regulator for controlling the first switch, which actuates the closing by its output at the moment of the switching on of the regulator, and actuates the opening of the first switch when the voltage at the output terminals of the regulator has reached a given threshold value (Vout) which ensures the efficient operation of the integrated circuit.

The first switch closes when the voltage on its control electrode is lower than the input voltage (Vin) of the circuit itself, and opens when the voltage is higher than (Vin). The control unit comprises a diode connected between the input and the output, and a unit which, when the power supply circuit is switched on, maintains the output at a voltage level lower than or equal to (Vin) until the diode becomes conductive, and which closes the second switch as soon as it becomes conductive.

Advantageously the unit comprises two units connected to the output by two outputs connected to each other by two conductors so that one of the units when switched on powers the other unit, one of the conductors energizes the other conductor, thus commanding the closing of the first switch, sends a holding command to the second unit by the other conductor and de-energizes one of the outputs after sending the second unit the holding command. The second unit, on receipt of a holding command by the second conductor, sends a signal to the second output to keep the first switch closed.

The first unit de-energizes as soon as, through the first output, the increase of the voltage level of the (Vout) value is sensed, and, at the same time, de-energizes the second unit through the second conductor. The second unit, upon de-energizing, sends the second switch a closing signal.

The first and second switches can be composed of P-channel MOS transistors. Where the second switch consists of a MOS transistor, it has its drain connected to the gate.

BRIEF DESCRIPTION OF THE DRAWING

The features of the invention will be more clearly evident from the following description of an embodiment, reference being made to the accompanying drawing, in which:

FIG. 1 is a block diagram of a voltage regulator of known type;

FIG. 2 is a block diagram of a regulator according to the invention;

FIG. 3 is a block diagram of an embodiment of the unit S of FIG. 2;

FIG. 4 is a block diagram of an embodiment of the unit T of FIG. 3; and

SPECIFIC DESCRIPTION

Figure 5:
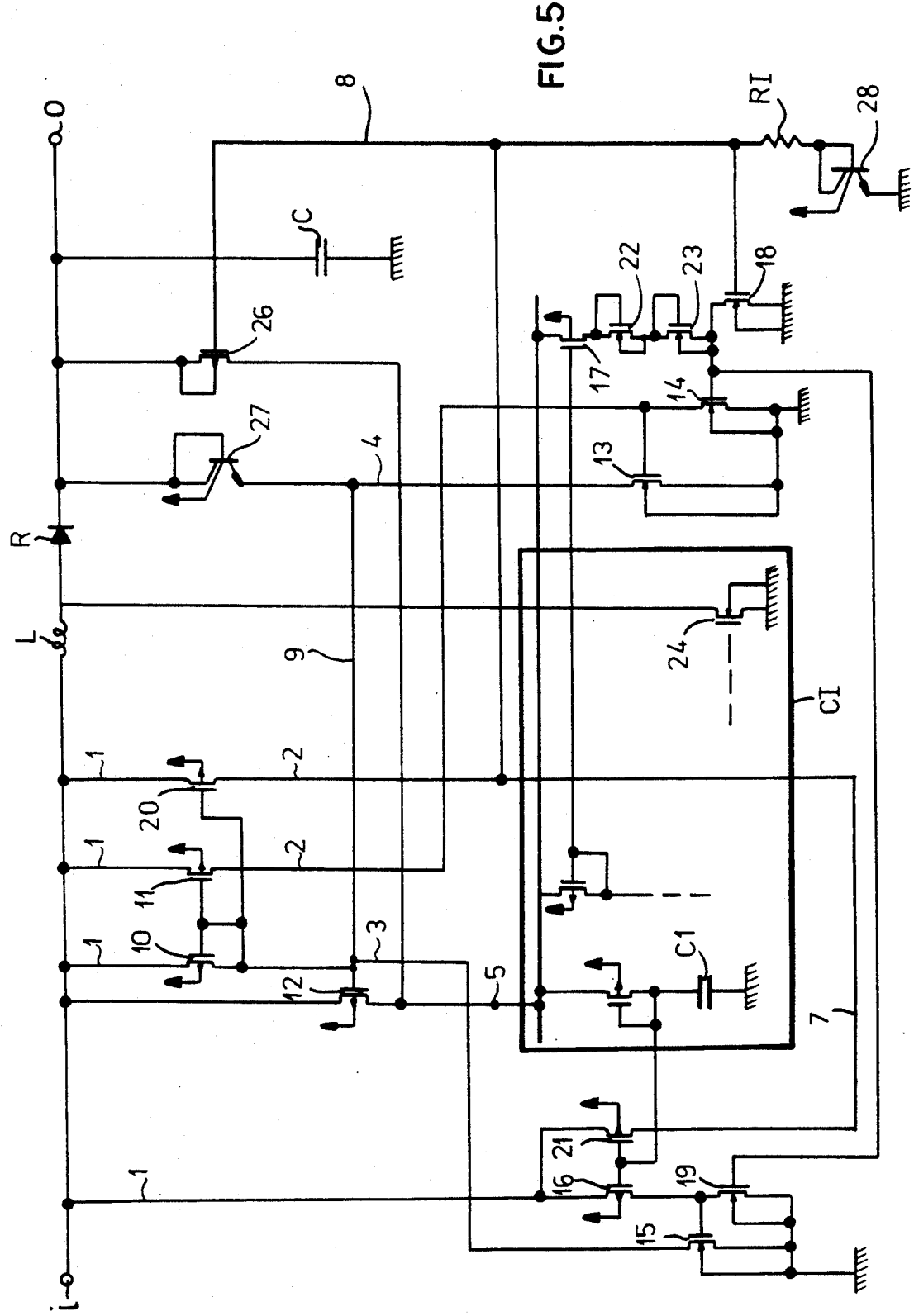
FIG. 5 is a diagram of a circuit embodying the diagrams referred to in FIGS. 2, 3 and 4.

FIG. 1 shows a block diagram of a known type of voltage regulator, in which Vin represents the input voltage, Vout represents the output voltage and CI represents an integrated circuit supplied, through the input 5, by the output voltage Vout. It comprises a solid-state switch I which, under control of the driver circuit D, applies intermittent pulses of input voltage Vin to the terminals of the inductor L. The voltage pulses thus applied to the terminals of L are discharged, through the diode R, onto the condenser C so as to increase its charging voltage Vout.

FIG. 2 is a block diagram of a power supply unit according to the invention, in which I1 represents a solid-state switch provided with a control electrode 9, I2 represents an electronic component consisting of a diode or of another solid-state switch provided with a control electrode, and S represents a control unit, supplied by the Vin voltage through the conductor 1, which controls the output voltage Vout through the conductor 6. When the regulator is turned on, S effects the closing of the switch I1 keeping it closed until the Vout voltage reaches a given threshold value which ensures the efficient operation of CI. At this point, S causes the opening of switch I1. S also effects the simultaneous closing of switch I2, in the case the latter is a switch provided with a control electrode (whereas, in the case switch I2 is a diode, the latter automatically becomes conductive as soon as Vout>Vin occurs).

FIG. 3 is a block diagram of the unit S of FIG. 2. This diagram assumes that the switch I1 is made in such a way that it closes when the voltage on the control electrode is lower than Vin and opens when it is higher. When the regulator is switched on, the unit T maintains its output 9 at a voltage level smaller than or equal to Vin until the diode Q is cut off. As soon as Q becomes conductive, the output 9 increases to a voltage value equal to Vout; voltage sensor T senses the increase in voltage of the conductor 9 to the aforesaid value and closes I2, by the output 8, in the case I2 is not a diode.

FIG. 4 is block diagram of the unit T of FIG. 3. According to FIG. 4 when the unit is switched on, switch A supplies power to switch B through the conductor 2 and at the same time energizes the output 3 thereby closing switch I1. At the same time, switch A, by means of the conductor 7, sends switch B a holding command. Upon receipt of this command, switch B sends a holding signal to the output which keeps the switch I1 closed. After which, A de-energizes its output 3.

When the switching regulator starts operating in the switching mode and the Vout increases to a value higher than Vin, the voltage of 9 is increased to the Vout value by means of the diode Q and switch I1 is consequently opened. As soon as A switch senses, by means of the conductor 3, that the voltage of 9 has increased to the Vout value, it de-energizes and at the same time removes the excitation from switch B, by means of 7. Should switch I2 not be a diode, switch B, as soon as it is de-energized, sends a closing signal to switch I2, by means of 8.

At this point, the step-up regulator begins to operate normally at its steady state, the supply circuit S is de-energized, and does not therefore take part in any way whatsoever in the overall consumption of energy. FIG. 5 shows a circuit made according to the diagrams referred to in FIGS. 2, 3 and 4, in which the various component parts are composed as follows:

unit A: of the P-channel 10, 11, 16, 20 and 21 and of N-channel 15 and 19 MOS transistors;
unit B: of the resistor R1, the dual-collector transistor 28, the (N-channel) MOS transistors 13, 14, 18, 22, 23 and the (P-channel) transistor 17;
diode Q: of the dual-collector transistor 27;
switch I: of the (N-channel) MOS transistor 24;
I1 and I2: of the (P-channel) MOS transistors 12 and 26, respectively.

At the moment the voltage Vin is applied, the condenser C1 is discharged and consequently all the Vin is applied, as Vgs, to the transistors 16 and 21, which begin to conduct.

The transistor 16 activates transistor 15, which in turn activates transistor 12 and consequently brings the Vin to the input 5 of CI, less the small voltage drop Vds at the terminals of 12. Upon transistor 15 becoming conductive, the transistors 10, 11 and 20 are triggered. The transistors 21 and 20 together contribute towards activating transistor 18 which maintains the gate of transistor 14 at a low level voltage. In this way transistor 13 becomes conductive through transistor 11 and the entire circuit assumes a stable condition, and remains so even when the condenser C is charged and transistors 16 and 21 (and consequently also the N-channel MOS transistor 15) are cut off.

Under these conditions transistor 26 is off, since its gate is connected to that of transistor 18 which is at high voltage level. As a result, the Vcc is supplied to the integrated circuit by Vin through transistor 12 in conduction, with transistor 26 off.

As soon as the regulator begins to operate normally (and Vout has consequently increased to a value higher than Vin), transistor 12 switches off since its gate voltage is increased to a high value by transistor 27 and its drain voltage is increased to a slightly higher value by transistor 26 (Vgate and Vdrain voltages both higher than Vsource).

Likewise, the mirror circuit composed of transistors 10, 11 and 20 switches off; the gate of transistor 18 discharges into transistor 28 and resistance R1. The transistor 26 becomes conductive and the transistor pair 14 and 19 is activated, cutting off the transistor pair 13 and 15.

From this moment on, the power to the entire circuitry is supplied by the Vout, less the small voltage drop $V_{DS}$ at the terminals 26.

It should be noted that once the power of the integrated circuit CI is supplied by the Vout through transistor 26, the start circuit no longer absorbs any current.

Numerous variations, additions or replacements of parts with others functionally equivalent may be made to the previously described embodiment without deviating from the scope of this invention.

One such variation consists of the possibility of replacing the transistor 26 with a diode, or a bipolar transistor or a MOS transistor, the latter two having a diode-connection. With this replacement the connecting conductor 8 is superfluous since the new component is forward biased as soon as the voltage Vout increases to a value higher than Vin+$V_{FD}$ of the component itself.

We claim:

1. A power supply circuit for a direct current voltage regulator with a step-up configuration comprising:
   an inductor connected to an input voltage;

a rectifier connected to said inductor;

a condenser connected to said rectifier and outputting an output voltage thereacross;

an integrated circuit connected between said inductor and said rectifier and having a driver energizable by an integrated circuit supply voltage;

a solid-state first switch connected to said input voltage and to said integrated circuit for delivering said supply voltage thereto when said solid-state first switch is conductive;

a second switch connected to said output voltage and to said integrated circuit for delivering said supply voltage thereto when said second switch is conductive, said solid-state first switch and said second switch being connected together across said inductor and constructed and arranged for alternating conductivity and open circuiting whereby said first switch and said second switch are not simultaneously conductive; and a control unit having an input terminal connected to an output terminal of the regulator and receiving said output voltage and having a third switch for generating an output rendering said solid-state first switch conductive upon switching on of said regulator, and for effecting open circuiting of said solid-state first switch when said output voltage reaches a threshold ensuring efficient operation of said integrated circuit, said third switch automatically closing upon said output voltage reaching said threshold; wherein said second switch is a diode, and said solid-state first switch has a control electrode and is rendered conducting when a voltage on said control electrode is lower than said input voltage, said control unit comprising another diode connected between said input terminal and an output of said control unit connected to said control electrode, said third switch including means for maintaining the output of said control unit at a voltage level at most equal to said input voltage until said other diode becomes conductive.

2. A power supply circuit for a direct current voltage regulator with a step-up configuration comprising:

an inductor connected to an input voltage;

a rectifier connected to said inductor;

a condenser connected to said rectifier and outputting an output voltage thereacross;

an integrated circuit connected between said inductor and said rectifier and having a driver energizable by an integrated circuit supply voltage;

a solid-state first switch connected to said input voltage and to said integrated circuit for delivering said supply voltage thereto when said solid-state first switch is conductive;

a second switch connected to said output voltage and to said integrated circuit for delivering said supply voltage thereto when said second switch is conductive, said solid-state first switch and said second switch being connected together across said inductor and constructed and arranged for alternating conductivity and open circuiting whereby said first switch and said second switch are not simultaneously conductive; and a control unit having an input terminal connected to an output terminal of the regulator and receiving said output voltage and having a third switch for generating an output rendering said solid-state first switch conductive upon switching on of said regulator, and for effecting open circuiting of said solid-state first switch when said output voltage reaches a threshold ensuring efficient operation of said integrated circuit, said third switch automatically closing upon said output voltage reaching said threshold, said second switch being a diode, said solid-state first switch having a control electrode and being rendered conducting when a voltage on said control electrode is lower than said input voltage, said control unit comprising another diode connected between said input terminal and an output of said control unit connected to said control electrode, said third switch including means for maintaining the output of said control unit at a voltage level at most equal to said input voltage until said other diode becomes conductive, said third switch including first and second switch units connected to said output of said control unit by first and second outputs respectively and connected to each other by first and second conductors, said first unit upon being switched on powering said second unit through said first conductor, energizing said first output to close said solid-state first switch, sending a holding command to said second unit through said second conductor, and de-energizing said first output upon sending of said holding command to said second unit; said second unit, upon receipt of a holding command through said second conductor, sending a signal to said second output to maintain said first solid-state first switch closed; said first unit de-energizing as soon as said first unit senses at the first output an increase of a voltage level at said output of the control unit to the voltage level of said output voltage, and simultaneously de-energizing said second unit through said second conductor.

3. The power supply circuit defined in claim 2 wherein said solid-state first switch is a P-channel MOS transistor and the first mentioned diode is an MOS transistor with a drain connected to a gate thereof.

4. The power supply circuit defined in claim 1 wherein said second switch is a solid-state switch having a control electrode.

5. The power supply circuit defined in claim 4 wherein said solid-state first switch has a control electrode and is rendered conducting when a voltage on said control electrode is lower than said input voltage, said control unit comprising a diode connected between said input terminal and an output of said control unit connected to said control electrode, said third switch including means for maintaining the output of said control unit at a voltge level at most equal to said input voltage until said diode becomes conductive and then closes said second switch.

6. A power supply circuit for a direct current voltage regulator with a step-up configuration comprising:

an inductor connected to an input voltage;

a rectifier connected to said inductor;

a condenser connected to said rectifier and outputting an output voltage thereacross;

an integrated circuit connected between said inductor and said rectifier and having a driver energizable by an integrated circuit supply voltage;

a solid-state first switch connected to said input voltage and to said integrated circuit for delivering said supply voltage thereto when said solid-state first switch is conductive;

a second switch connected to said output voltage and to said integrated circuit for delivering said supply voltage thereto when said second switch is conductive, said solid-state first switch and said second switch being connected together across said inductor and constructed and arranged for alternating conductivity and open circuiting whereby said first switch and said second switch are not simultaneously conductive; and a control unit having an input terminal connected to an output terminal of the regulator and receiving said output voltage and having a third switch for generating an output rendering said solid-state first switch conductive upon switching on of said regulator, and for effecting open circuiting of said solid-state first switch when said output voltage reaches a threshold ensuring efficient operation of said integrated circuit, said third switch automatically closing upon said output voltage reaching said threshold, said second switch being a solid-state switch having a control electrode, said solid-state first switch having a control electrode and being rendered conducting when a voltage on said control electrode is lower than said input voltage, said control unit comprising a diode connected between said input terminal and an output of said control unit connected to said control electrode, said third switch including means for maintaining the output of said control unit at a voltage level at most equal to said input voltage until said diode becomes conductive and then closes said second switch, said third switch including first and second switch units connected to said output of said control unit by first and second outputs respectively and connected to each other by first and second conductors, said first unit upon being switched on powering said second unit through said first conductor, energizing said first output to close said solid-state first switch, sending a holding command to said second unit through said second conductor, and de-energizing said first output upon sending of said holding command to said second unit; said second unit, upon receipt of a holding command through said second conductor, sending a signal to said second output to maintain said solid-state first switch closed; said first unit de-energizing as soon as said first unit senses at the first output an increase of a voltage level at said output of the control unit to the voltage level of said output voltage, and simultaneously de-energizing said second unit through said second conductor, said second unit upon de-energizing sending a closing signal to said second switch.

7. The power supply circuit defined in claim 6 wherein said first solid-state switch and said second solid-state switch are P-channel MOS transistors.

* * * * *